United States Patent
Chuang et al.

(10) Patent No.: US 6,591,333 B1
(45) Date of Patent: Jul. 8, 2003

(54) METHOD FOR COMPLETING INCOMPLETE RECORDING ON AN OPTICAL DISK

(75) Inventors: Yen-Hui Chuang, Taoyuan (TW); Meng-Shin Yen, Taoyuan (TW)

(73) Assignee: BenQ Corporation, Taoyuan (TW)

( * ) Notice: Subject to any disclaimer, the term of this patent is extended or adjusted under 35 U.S.C. 154(b) by 0 days.

(21) Appl. No.: 09/538,122

(22) Filed: Mar. 28, 2000

(51) Int. Cl.[7] .......................... G06F 12/00; G06F 13/00
(52) U.S. Cl. .............................. 711/112; 711/4; 707/205
(58) Field of Search .......................... 711/4, 111, 112; 707/205

(56) References Cited

U.S. PATENT DOCUMENTS

| | | | | |
|---|---|---|---|---|
| 5,774,431 A | * | 6/1998 | Bos et al. | 369/30.28 |
| 6,401,168 B1 | * | 6/2002 | Williams et al. | 711/112 |
| 6,401,169 B1 | * | 6/2002 | McMurdie et al. | 711/112 |
| 6,405,283 B1 | * | 6/2002 | James | 711/112 |

\* cited by examiner

*Primary Examiner*—Reginald G. Bragdon
*Assistant Examiner*—Pierre M. Vital
(74) *Attorney, Agent, or Firm*—Birch, Stewart, Kolasch & Birch, LLP

(57) ABSTRACT

The method first reads content of a file logical information recorded on the first track of an optical disk. Secondly, the method, based on content of the file logical information, detects one subset data, within the multiple subsets of data corresponding to the file logical information, as being not recorded on the first track. Afterwards, the method determines if an initial recording position of the one subset data obtained in previous step is larger than a start position of a second track of the disk. If it is yes in previous step, the method stores a file logical information corresponding to the one subset data into a recording index table. Finally, the method, according to the recording index table, records the one subset data on the second track.

3 Claims, 4 Drawing Sheets

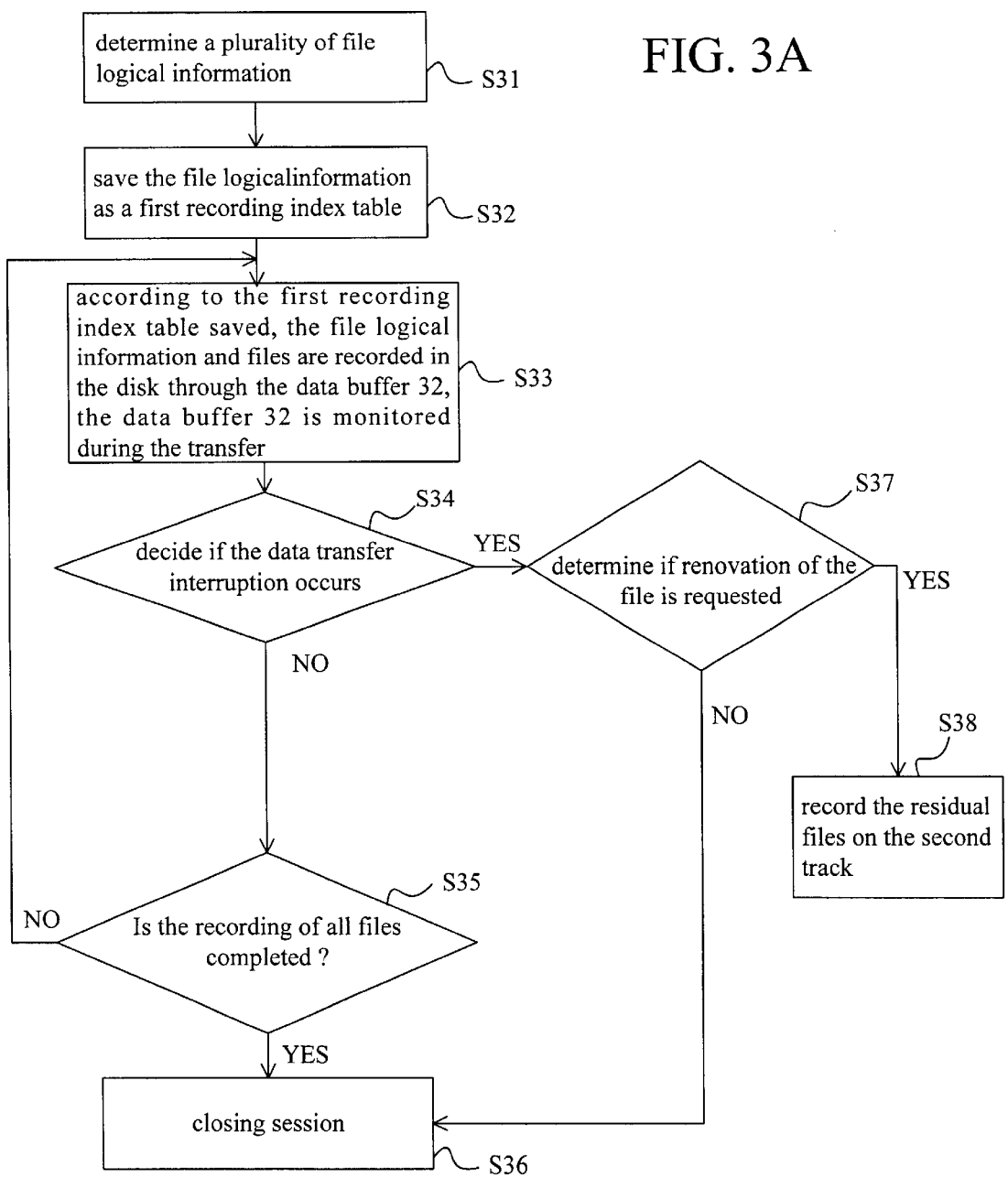

METHOD FOR COMPLETING INCOMPLETE RECORDING ON AN OPTICAL DISK

FIELD OF THE INVENTION

The present invention relates to a method of recording a file, which includes multiple subsets of data and is incompletely recorded on a first track of an optical disk during a previous recording operation, on a second track of the optical disk.

BACKGROUND OF THE INVENTION

Recently the industries have paid attention on storing data in ISO 9660 format on an optical disk. As the data are stored on a disk in ISO 9660 format, the CD-R or CD-RW is used to denote the disk. Hereinafter, a CD-R system is taken as an example to illustrate the present invention.

Referring to FIG. 1, the construction of a typical CD-R recording system 11, to which an optical disk write (recording) method described later is applied, is shown. The CD-R recording system 11 includes a CD-R drive 12 and a host computer 13 which sends out the recording commands to the CD-R drive 12. The CD-R drive 12 performs data write/read processes on a disk 21 in accordance with a command from the host computer 13 on signal line 35.

A write/read part 14 of the CD-R drive 12 includes a spindle motor 22 for rotating the disk 21, a pickup (PU) 23 for projecting a laser beam to a target track on the disk 21, a pickup feeding mechanism 24 for translating the pickup 23 in a radial direction of the disk 21, and a head amplifier 25 for converting a restored signal received (restored) by the pickup 23 into a signal having a predetermined level on line 251. The write/read part 14 also includes a servo circuit 26 for generating a wobble servo signal that controls the spindle motor 22, and for controlling the position of the pickup 23, an encoder 31, and a CPU 33 serving as a controller for controlling the entirety of the CD-R drive 12.

The CD-R drive 12 has an interface circuit, hereinafter referred to as I/F 34, and a buffer 32. The buffer 32 has a predetermined data storage capacity and stores data supplied thereto by the host computer 13. For example, the buffer 32 may have a capacity of 3 megabytes. An FIFO (first in first out) scheme, for example, is employed in the buffer 32. The encoder 31 subjects the data supplied from the buffer 32 to EFM modulation, together with subcodes, in accordance with a predetermined standard, and supplies the modulated data to the pickup 23.

The CPU 33 is equipped with a ROM and a RAM (not shown). The CPU 33 is connected to the I/F 34 via a bus 37 including multiple data signal lines and at least one control signal line, and to the buffer 32 via a control signal line. The buffer 32 is connected to the I/F 34 via a bus 39.

As well known in the arts, the guide grooves (pregrooves) that are optically detectable are formed at track positions on the disk 21 before the disk 21 stores any data. The servo circuit 26 generates a track signal and a focus signal based on the signal on line 251 supplied from the head amplifier 25, and supplies the track signal and the focus signal to control the pickup 23. The servo circuit 26 generates a wobble signal and supplies the same to the spindle motor 22. Accordingly, the pickup 23 remains aligned with the target track on the disk 21 and the rotation of the disk 21 is controlled to have a constant speed with respect to the pickup 23.

The host computer 13 includes a CPU block 41, a hard disk drive (HDD) 42, an I/F 43 for interfacing with the CD-R drive 12, a display 45, and an input unit 44. In general, a plurality of files to be recorded on the disk 21 are stored in the HDD 42.

The CPU block 41 includes a CPU, a ROM (not shown), a RAM (not shown), and an interface circuit (not shown) with the HDD 42. The CPU block 41 is connected to the I/F 43 via a bus 46 including multiple data signal lines and at least one control signal line. The I/F 43 is connected to the I/F 34 of the CD-R drive 12 via a bus 35 including multiple data signal lines and at least one control signal line. The host computer 13 may be embodied by an ordinary personal computer.

In the CPU block 41, a driver for interfacing with a user and a write (recording) utility program is executed during file recording operation. The write utility program is used to manage the recording operation on the disk 21.

In "Orange Book Part II", the CD-R standards on which the prior art methods are based is disclosed. Prior art disk write methods, including disk-at-once method, track-at-once method and session-at-once method, have been extensively practiced in a conventional optical disk recording system.

The term 'track' used hereinafter represents a continuous stream of information and is not to be confused with the physical concentric 'tracks' in the configuration of the optical disk. It is noted that an optical disk is generally structured into one or more tracks where a track represents an organized unit of information.

The prior art methods are suitable for high speed data recording operation. However, the prior art methods require that a continuous and uninterrupted stream of data is to be written. If the data flow is interrupted during recording operation, the medium is rendered useless. This is a result of the inability to locate the position of the last written data. An interruption of the data recording is referred to as an under-run condition.

The foregoing and other state-of-the-art optical disk write approaches indicate a need for a new method for completing recording of a file which is incompletely or unsuccessfully recorded due to under-run condition.

SUMMARY OF THE INVENTION

It is an objective of the invention to provide a method for completing recording of a file on a second track of a disk. The file, which includes multiple subsets of data, is incompletely recorded on a first track of the disk during a previous recording operation.

According to the invention, the method first reads content of a file logical information recorded on the first track. Secondly, the method, based on content of the file logical information, detects one subset data, meaning subset of data, of the multiple subsets of data corresponding to the file logical information, as being not recorded on the first track of disk. Afterwards, the method determines if an initial recording position of the one subset data obtained in previous step is larger than a start position of the second track. If it is yes in previous step, the method stores a file logical information corresponding to the one subset data into a recording index table. Finally, the method, according to the recording index table, records the one subset data on the second track.

The advantage and spirit of the invention may be understood by the following recitations together with the appended drawings.

BRIEF DESCRIPTION OF THE APPENDED DRAWINGS

FIG. 3A is a flowchart showing a method of recording a plurality of files on an optical disk in accordance with the present invention.

DETAILED DESCRIPTION OF THE INVENTION

Figure 2A:
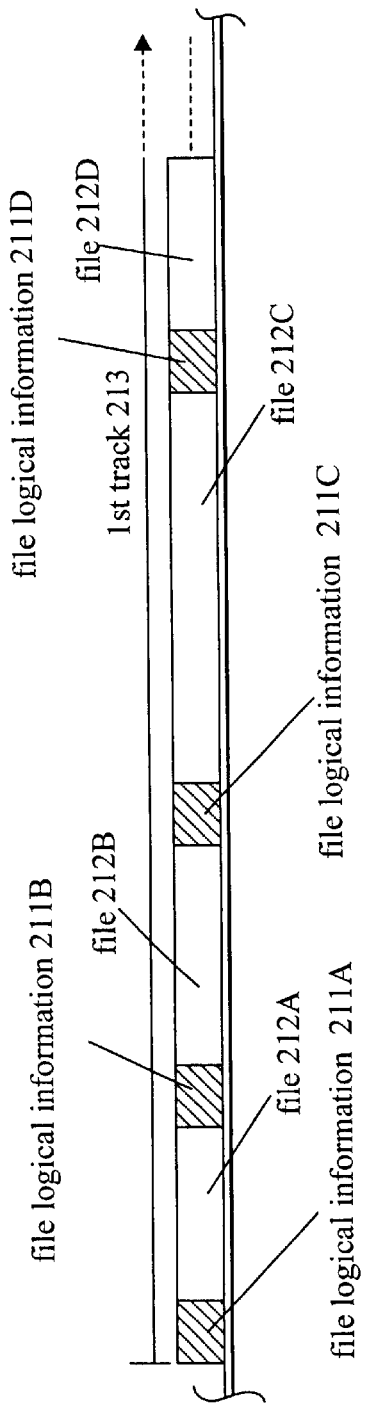
FIG. 2A shows an arrangement of data recorded on an optical disk according to the method of the invention as interruption is not occurred.

Referring to FIG. 2A, a data structure of a plurality of files 212A, 212B, 212C, 212D to be recorded on the disk in accordance with the invention is shown. In general, each file 212A, 212B, 212C or 212D includes multiple subsets of data, and its corresponding file logical information 211A, 211B, 211C or 211D indicates the initial recording position and length of each subset of data. If the recorded data flow is not interrupted, the plurality of file logical information and corresponding files are alternately and sequentially recorded within a first track 213, as shown in FIG. 2A. It is noted that each file follows its corresponding file logical information in the continuous stream of information.

Figure 2B:
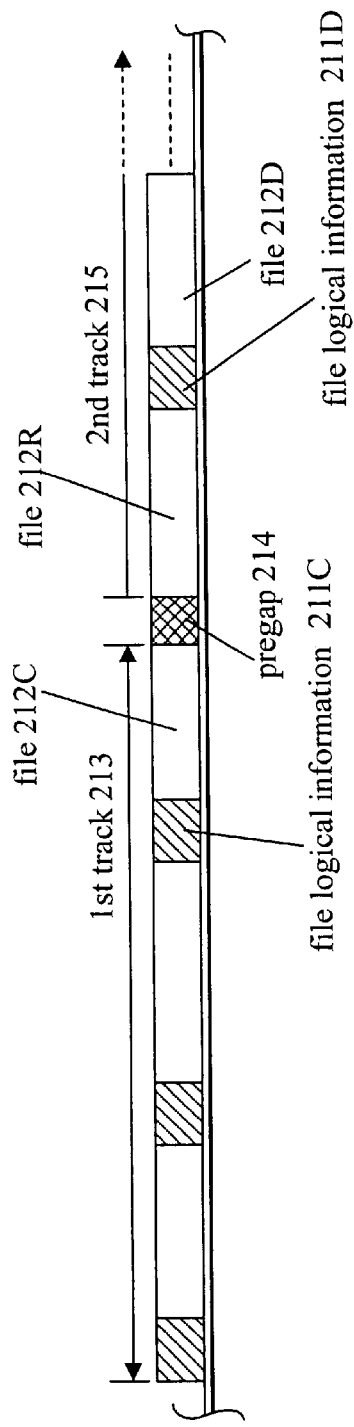
FIG. 2B shows an arrangement of data recorded on an optical disk according to the method of the invention as interruption is occurred.

However, if data flow is interrupted during a recording operation of the file 212C, the first track 213 will be terminated and a pregap 214 is marked. As shown in FIG. 2B, the residual file 212R corresponding to the file 212C and all other files not recorded yet due to the interruption will be recorded within a second track 215 starting at the end of the pregap 214 as a further recording operation is requested. All data in the pregap 214 between the first track 213 and the second track 215 are useless.

Referring to FIG. 3A, in step S31, to a plurality of files to be recorded, a plurality of file logical information are determined respectively according to a predetermined format, i.e. ISO 9660 standard format. Each file logical information corresponds to one file to be recorded.

Subsequently, in step S32, the plurality of file logical information are saved as a first recording index table. In practical application, the first recording index table is stored in the HDD 42 to prevent the first recording index table from being lost due to an unexpected event such as a power down or a hangup of the system.

Figure 1:
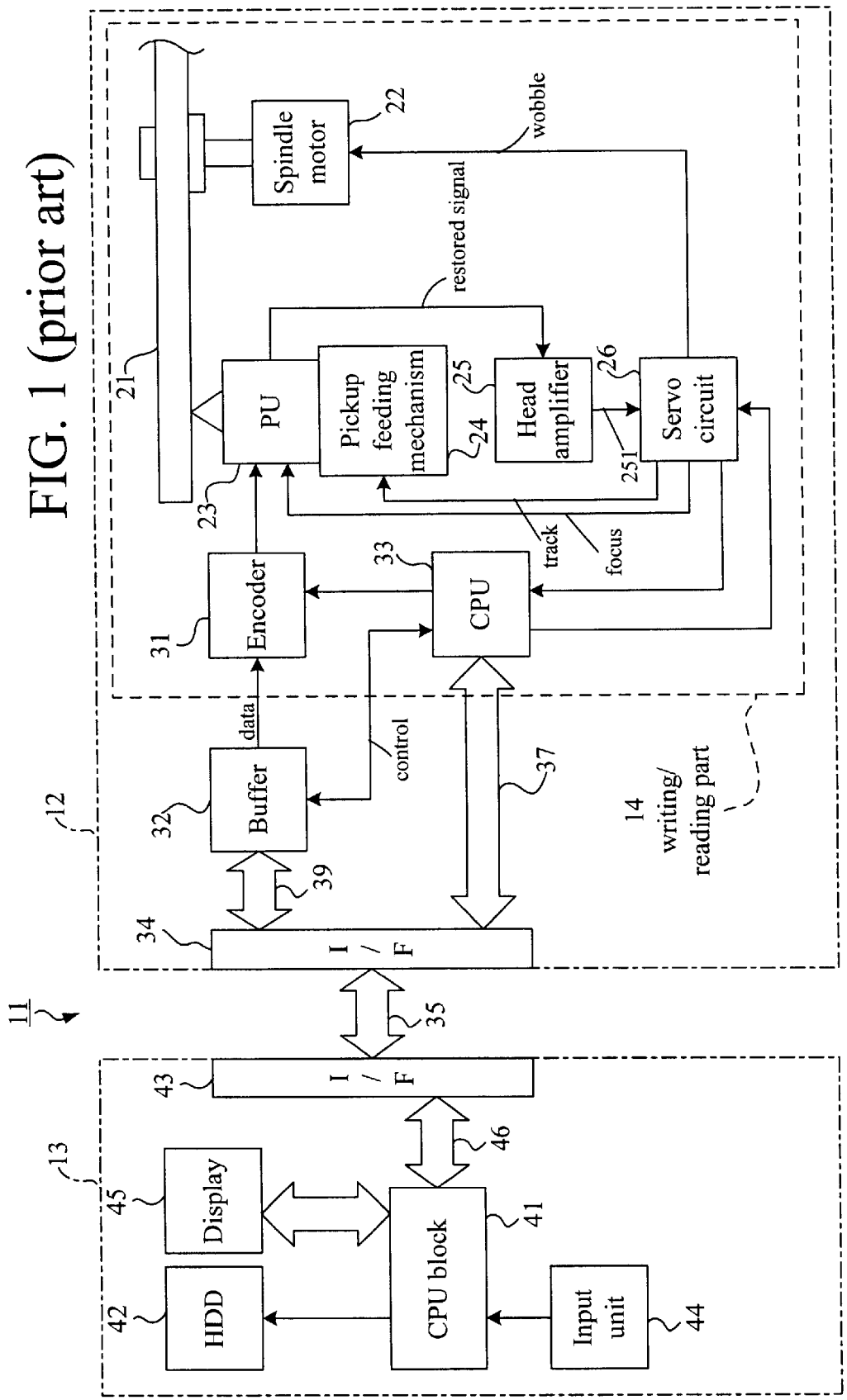
FIG. 1 shows the construction of a typical CD-R recording system 11.

Afterward, in step S33, according to the first recording index table saved, the file logical information and files are recorded on the first track of the disk 21 through the data buffer 32 shown in FIG. 1 in a predetermined order with one file following the corresponding file logical information. Also in step S33, the data buffer 32 is monitored during the transfer. Afterward, in step S34, the method decides if the data transfer interruption occurs in the data buffer 32. If NO in step S34, step S35 is performed. Step S35 determines whether the recording of all files is completed. If No in step S35, procedure goes to step S33. If YES in step S35, procedure goes to step S36. In step S36, the closing session of recording operation is performed.

If YES in step S34, step S37 is performed. In step S37, the user determines if he wants to renovate the residual files. If No in step S37, step S36 is then performed. If YES in step S37, step S38 is performed to renovate the residual files not yet recorded.

Figure 3B:
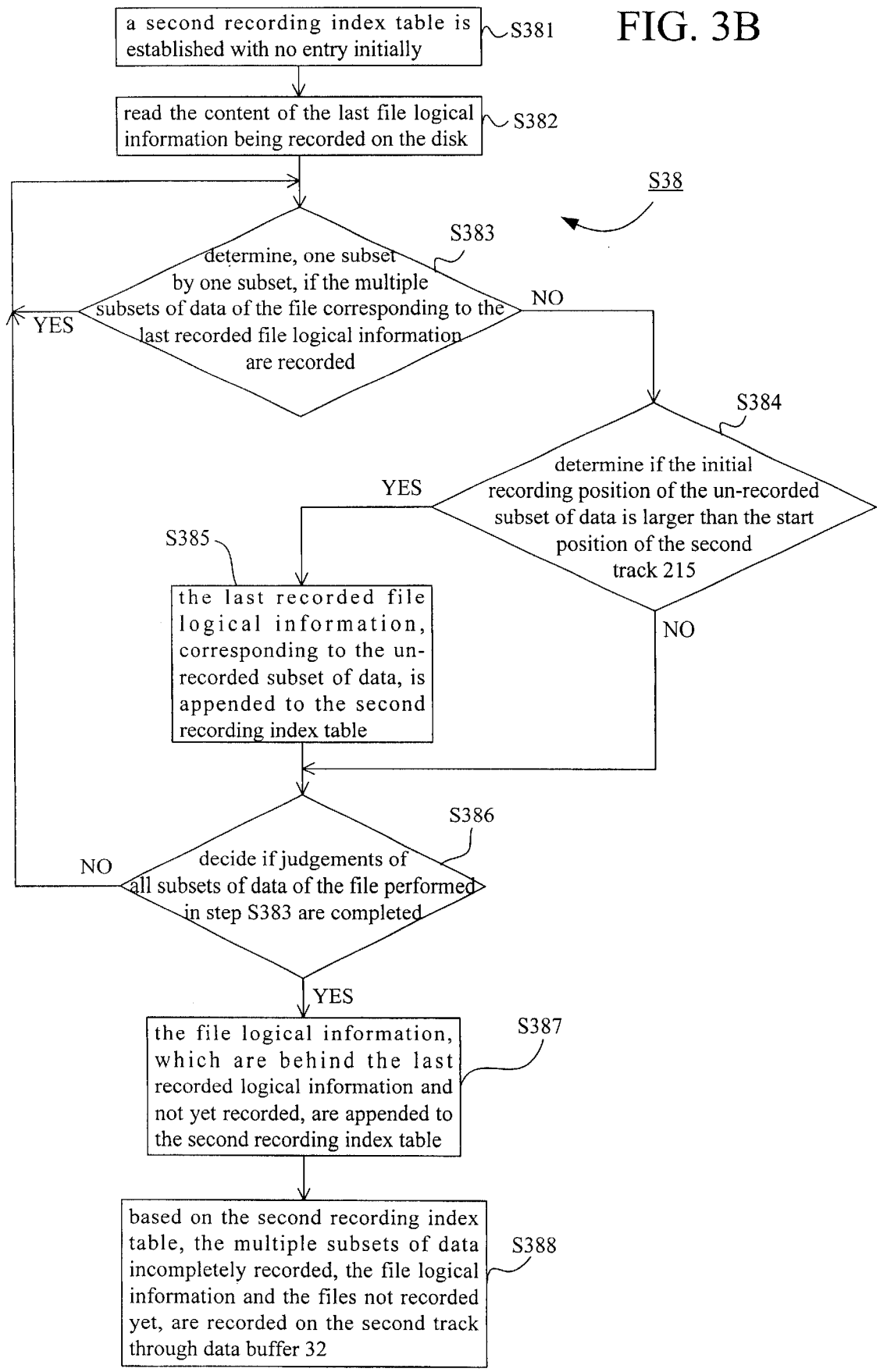
FIG. 3B is a flowchart showing the series of steps in block S38 of FIG. 3A.

Referring to FIG. 3B, in step S381, a second recording index table is established with no entry initially. In practical application the second recording index table is also stored in the HDD 42.

In step S382, the method reads the content of the last file logical information 211C being recorded on the first track 213 of disk 21. Hereinafter, the last file logical information being recorded is referred to as the last recorded file logical information 211C. In step S383, the method determines, one subset by one subset, whether the multiple subsets of data of the file corresponding to the last recorded file logical information 211C are recorded on the first track 213. If Yes in step S383, the step S383 is performed again for next subset data of the file.

If NO in step S383, step S384 is performed to determine whether the recording position of the un-recorded subset of data is larger than the start position of the second track 215. If YES in step S384, step S385 is performed.

In step S385, the last recorded file logical information 211C, corresponding to the un-recorded subset of data, is appended to the second recording index table. Either it is NO in step S384 or after step S385, step S386 is performed. It is noted that, all un-recorded subset of data, that have recording positions smaller than the start position of the second track 215, would not be recorded on the second track 215 according to the present invention. This is one limitation of the invention.

Step S386 decides whether the judgement of all subsets of data of the file performed in step S383 are completed. If No in step S386, step S383 is performed. If YES in step S386, step S387 is performed.

In step S387, the file logical information 211D, which is behind the last recorded logical information 211C and not yet recorded, are appended to the second recording index table. Subsequently in step S388, based on the second recording index table, the multiple subsets of data incompletely recorded (file 212R), the file logical information 211D and the fil 212D not recorded yet, are recorded on the second track 215 through the data buffer 32 in the predetermined order.

It is to be noted that, to successfully implement the invention, content of the last recorded file logical information mentioned in step S382 must be retrieved and accurate. However, if interruption of data buffer 32 happens during the transfer of the last recorded logical information, the content obtained in step S382 would be inaccurate. In other words, the present invention can not apply to such condition. This is another limitation of the invention.

While the CD-R and the CD-RW disk is selected as an example to explain the embodiment of the invention, the invention can be also applied to disk of type of a MD, DVD-RAM and the like.

What is claimed is:

1. A method for completing recording of a file and a file logical information corresponding to the file on a disk, the file including multiple subsets of data, the file logical information being correctly recorded on a first track of the disk and the file being incompletely recorded on the first track of the disk during a previous recording operation, said method comprising the steps of:

(1) reading content of the file logical information. recorded on the first track;

(2) based on content of the file logical information, detecting one subset of data, within the multiple subsets of data corresponding to the file logical information, as being not recorded on the first track;

(3) determining if an initial recording position of said one subset of data obtained in step (2) is larger than a start position of a second track of the disk;

(4) if the initial recording position of said one subset of data obtained in step (2) is larger than the start position of the second track of the disk, storing a file logical information corresponding to said one subset of data into a recording index table;

(5) according to the recording index table, recording said one subset of data of the file on the second track.

2. A method of recording a file on an optical disk by an optical disk recording apparatus having a data buffer, the file including multiple subsets of data, said method comprising the steps of:

(1) determining, according to a predetermined format, a file logical information corresponding to the file to be recorded;

(2) saving the file logical information as a first recording index table;

(3) recording, according to the first recording index table, the file logical information and the file on a first track of the optical disk through the data buffer and monitoring the data buffer during data transfer;

(4) deciding whether interruption of data transfer in the data buffer happens;

(5) if interruption of data transfer in the data buffer happens, performing the following steps:

(51) based on content of the file logical information, detecting one subset of data, within the multiple subsets of data corresponding to the file logical information, as being not recorded on the first track;

(52) determining if an initial recording position of said one subset of data obtained in step (51) is larger than a start position of a second track of the disk;

(53) if the initial recording position of said one subset of data obtained in step (51) is larger than the start position of the second track of the disk, storing a file logical information corresponding to said one subset of data into a second recording index table;

(54) according to the second recording index table, recording said one subset of data on the second track.

3. The method of claim 2, wherein the data buffer is a first-in-first-out buffer device.

* * * * *